June 11, 1963 H. G. DE FRANCE 3,093,704

COLOR TELEVISION CAMERA SYSTEMS

Filed Oct. 22, 1958

United States Patent Office 3,093,704

Patented June 11, 1963

3,093,704

COLOR TELEVISION CAMERA SYSTEMS

Henri Georges de France, Paris, France, assignor to Compagnie Francaise de Television, a corporation of France Filed Oct. 22, 1958, Ser. No. 768,906
Claims priority, application France Nov. 5, 1957
5 Claims. (Cl. 178—5.4)

Figure 1:
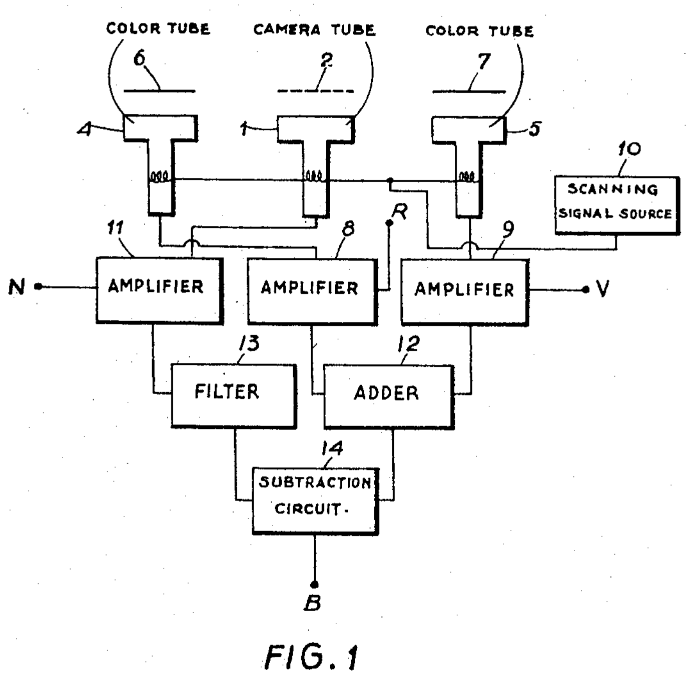

The present invention relates generally to color television.

More particularly, it relates to improved reproduction of colors in camera shooting techniques by making use of one tube responsive to several elementary colors and of two or more tubes responsive to one elementary color.

The system according to the invention comprises a high definition panchromatic camera tube and two or more low definition camera tubes, associated with respective one color filters of a different color for each tube, a composite three color filter being provided between the scene to be televised and said three color tube.

The invention will be better understood from the following description and appended drawing given by way of example.

Figure 2:
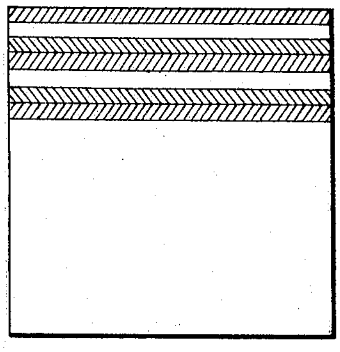
Figure 3:
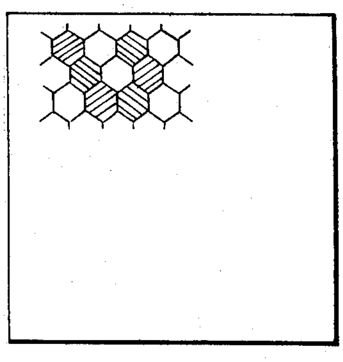

In the drawing;

FIG. 1 is a block diagram of a camera arrangement for color television according to the invention, FIGS. 2 and 3 illustrate diagrammatically two embodiments of a filter used with the camera of FIG. 1.

Referring to FIG. 1 the system of the invention comprises a main camera tube 1 which receives luminous information from the scene or subject to be televised through a composite filter 2, the structure and design of which will be described later in connection with FIGS. 2 and 3.

Two color tubes 4 and 5 are adjacent tube 1. Tubes 4 and 5 are equipped with chromatic filters 6 and 7 respectively corresponding to two elementary colors.

Tubes 1, 4 and 5 receive their scanning signals from a common source 10. The video signals from tubes 4 and 5 are fed to independent amplifier circuits 8 and 9, having a low band-width equal, for instance, to one fifth of the band width of the video signal in the system considered. The video signal provided by tube 1 is amplified in a wide-band amplifier circuit 11. An adder circuit 12 adds the information, for example, green and red, delivered by tubes 4 and 5. Amplifier circuit 11 provides at its output N the luminance signal and is also connected through a low pass filter 13 to a subtraction circuit 14, also receiving the output signal of the adder circuit 12. Circuit 14 provides at B one of the elementary color information signals, in this case the blue information. The red and green monochrome information signals are respectively provided at R and V by channels 8 and 9. The characteristic of the low-pass filter 13 is similar to that of channels 8 and 9.

The three monochrome signals are then used for the transmission of the chrominance signals after having been subjected to the transformation required by the type of transmission system used.

FIGS. 2 and 3 illustrate two embodiments of filter 2 which, according to the invention, is inserted between the televised scene and the camera tube 1. This filter comprises juxtaposed elements, preferably having a simple geometry in order to facilitate the construction thereof. In the structure illustrated in FIG. 2, parallel red, blue and green strips of equal or different width are used. It is essential that the total areas, respectively occupied by the elements of different colors, be equal with the operating mode described in connection with FIG. 1.

In the embodiment illustrated in FIG. 3, the elements building up the filter structure are in the shape of hexagons. These elements may be cut out separately and then glued or pasted together according to known methods. Alternatively, these filters may be constituted by a homogenous transparent support, the transmission characteristics of which are locally modified by painting or otherwise.

Filter 2 must be positioned in such a manner that the elementary beams having traversed the elements constituting the filter combine again before illuminating tube 1.

Under these conditions, it may be assumed that the spectral distribution curve of the light illuminating tube 1 corresponds accurately to the curve resulting from the combination of the respective sensitivity curves of the elements building up the filter. It is therefore possible, by subtracting the two elementary color signals, provided by elementary color tubes 4 and 5, from the output of tube 1, to obtain a signal corresponding with precision to the third monochrome.

The expression "high definition" indicates the definition corresponding to the standard system used, whereas "low definition" corresponds to at most one quarter of the number of the points as defined by the standard system under consideration.

It is to be understood that many modifications are possible without departing from the scope and spirit of the invention. Thus, three color tubes such as tubes 4 and 5 could be used instead of two, directly providing the three color signals.

What is claimed is:

1. A color television camera system comprising a first camera tube for providing a luminance signal; a second and a third camera tube and chromatic filters respectively associated with said second and third tube for providing color signals of two different elementary colors; synchronous scanning means for said three tubes; means for adding the respective output signals of said second and third tubes to provide a composite signal; means for subtracting said composite signal from the output signal of said first tube to provide a color signal of a third elementary color; and a three color filter positioned for receiving luminous rays from an object to be televised and directing them on said first tube, said filter comprising filtering elements of said three elementary colors.

2. A color television camera system comprising a first camera tube for providing a luminance signal; a second and a third camera tube and chromatic filters respectively associated with said second and third tube for providing color signals of two different elementary colors; synchronous scanning means for said three tubes; means for adding the respective output signals of said second and third tubes to provide a composite signal; means for subtracting said composite signal from the output signal of said first tube to provide a color signal of a third elementary color; and a three color filter positioned for receiving luminous rays from an object to be televised and directing them on said first tube, said filter comprising juxtaposed elements of said three elementary colors, the total areas respectively occupied by the elements of each color being equal.

3. A color television camera system comprising a first camera tube for providing a luminance signal, a second and a third camera tube and chromatic filters respectively associated with said second and third tube for providing color signals of two different elementary colors; synchronous scanning means for said three tubes; means for adding the respective output signals of said second and third tubes to provide a composite signal; means for subtracting said composite signal from the output signal of said first tube to provide a color signal of a third elementary color; and a three color filter positioned for receiving luminous rays from an object to be televised and directing them on said first tube, said filter comprising elementary strips of said three elementary colors, the total areas respectively occupied by the elements of each color being equal.

4. A color television camera system comprising a first camera tube for providing a luminance signal, a second and a third camera tube and chromatic filters respectively associated with said second and third tube for providing color signals of two different elementary colors; synchronous scanning means for said three tubes; means for adding the respective output signals of said second and third tubes to provide a composite signal; means for subtracting said composite signal from the output signal of said first tube to provide a color signal of a third elementary color; and a three color filter positioned for receiving luminous rays from an object to be televised and directing them on said first tube, said filter comprising juxtaposed elements, having a regular geometry, of said three elementary colors, the total areas respectively occupied by the elements of each color being equal.

5. A color television camera system comprising a camera tube for providing a luminance signal, a camera arrangement for providing color signals of at least two different colors, synchronous scanning means for said tube and said camera arrangement, and a three color filter comprising filtering elements of said at least two colors, said filter being positioned for receiving luminous rays from an object to be televised and directing them on said tube.

References Cited in the file of this patent

UNITED STATES PATENTS

| | | |
|---|---|---|
| 2,416,918 | Goldsmith | Mar. 4, 1947 |
| 2,892,883 | Jesty et al. | June 30, 1959 |